United States Patent
Workman et al.

(10) Patent No.: US 10,217,011 B2
(45) Date of Patent: Feb. 26, 2019

(54) APPARATUS AND METHOD FOR FACILITATING MANUAL SORTING OF SLIDES

(71) Applicant: Agilent Technologies, Inc., Santa Clara, CA (US)

(72) Inventors: Richard K. Workman, Sunnyvale, CA (US); Victor Lim, Pacifica, CA (US); Varun Raghunathan, Bangalore (IN)

(73) Assignee: Agilent Technologies, Inc., Santa Clara, CA (US)

(*) Notice: Subject to any disclaimer, the term of this patent is extended or adjusted under 35 U.S.C. 154(b) by 9 days.

(21) Appl. No.: 15/424,700

(22) Filed: Feb. 3, 2017

(65) Prior Publication Data

US 2017/0301105 A1 Oct. 19, 2017

Related U.S. Application Data

(60) Provisional application No. 62/323,308, filed on Apr. 15, 2016.

(51) Int. Cl.
| | |
|---|---|
| G06K 9/00 | (2006.01) |
| G06K 9/18 | (2006.01) |
| G02B 21/36 | (2006.01) |
| H04N 5/247 | (2006.01) |

(52) U.S. Cl.
CPC .......... *G06K 9/183* (2013.01); *G02B 21/365* (2013.01); *H04N 5/247* (2013.01)

(58) Field of Classification Search
None
See application file for complete search history.

(56) References Cited

U.S. PATENT DOCUMENTS

| | | |
|---|---|---|
| 6,847,481 B1 | 1/2005 | Ludl et al. |
| 8,676,509 B2 | 3/2014 | De La Torre-Bueno |
| 8,712,118 B2 | 4/2014 | De La Torre-Bueno |
| 2004/0016684 A1 | 1/2004 | Braginsky |

(Continued)

FOREIGN PATENT DOCUMENTS

| | | |
|---|---|---|
| CN | 1287913 A | 3/2001 |
| CN | 202909958 U | 5/2013 |

(Continued)

OTHER PUBLICATIONS

China Office Action dated Dec. 7, 2017, Application No. 201480033762.X.

(Continued)

*Primary Examiner* — Idowu O Osifade

(57) ABSTRACT

The present invention includes an apparatus and method that facilitates the manual sorting of slides into slide folders. The apparatus includes a horizontal display surface and a controller configured to receive slides and folders into which the slides are to be placed (or sorted). The controller operates components of the apparatus to selectively illuminate the display surface to guide a user in placing folders at multiple folder locations and in sorting the slides into the folders. In one aspect of the invention, the apparatus is configured to allow multiple folders to be stacked at a folder location during the slide sorting process. In these aspects, the apparatus is configured to determine number of folders stacked at each folder location.

20 Claims, 4 Drawing Sheets

(56) References Cited

U.S. PATENT DOCUMENTS

2007/0073585 A1   3/2007  Apple
2012/0056717 A1   3/2012  Maharbiz
2016/0139387 A1*  5/2016  Virk .................... G02B 21/002
                                                        348/79

FOREIGN PATENT DOCUMENTS

CN       103144802 A      6/2013
WO       2004-009257 A1   1/2004
WO       2013/170204 A1   11/2013
WO       WO2014200618     12/2014

OTHER PUBLICATIONS

EP Office Action dated Dec. 4, 2017, Application No. 14811005.9.
Office Action dated Jul. 9, 2018, China Application No. 201480033762.X.
International Search Report dated Aug. 27, 2014, International Application No. PCT/US2014/034045.
Extended European Search Report dated Jan. 5, 2017, EP Application 14811005.9.

* cited by examiner

APPARATUS AND METHOD FOR FACILITATING MANUAL SORTING OF SLIDES

CROSS-REFERENCING

This application claims the benefit of provisional application Ser. No. 62/323,308, filed on Apr. 15, 2016, which application is incorporated by reference herein in its entirety.

BACKGROUND OF THE INVENTION

In histopathology laboratories, specimens that have been prepared from patient tests and mounted on microscope slides must be sorted into slide holders (or folders) for viewing by various pathologists who work in the laboratory. A folder typically includes multiple slide locations and thus holds multiple slides. A folder can be filled with a desired combination of slides, e.g., for a particular patient, for a particular pathologist who is assigned to view the slides, and/or on the type of samples on the slides. Slide sorting is one of the time consuming and manual tasks in histopathology laboratories, and is not easily automated. In addition to manually organizing slides into folders, descriptive reports are often required to be included prior to distribution to a pathologist for diagnosis. Slide sorting and the generation of descriptive reports is a major bottleneck in histopathology laboratory workflows.

Fully automated slide sorting systems in which robots sort the slides and place them into folders present challenges. For example, there is a high cost of replacing a slide that is damaged during the automated handling process. In many cases, replacing a slide is impossible, since the original patient sample is depleted and obtaining another sample requires surgery or other invasive procedures on the patient. Hence, a fully automated sorting system has not found widespread acceptance.

SUMMARY OF THE INVENTION

The present invention includes an apparatus and method that facilitates the manual sorting of slides into slide holders (or folders). The apparatus includes a horizontal display surface that can be selectively illuminated and that is adapted for receiving the slides to be sorted and that includes multiple folder locations. An identification reader reads identification information stored on the slides (e.g., a barcode). A controller causes an area on the display surface corresponding to one of the slides to be illuminated based on its identification information and indicates a slide location in a folder (i.e., in one of the folder locations) to which the illuminated slide is to be moved/placed by a user of the apparatus. The controller also indicates a folder location to which/from which a particular folder is to be moved. In one aspect of the invention, the apparatus is configured to allow folders at the multiple folder locations to be stacked. In these aspects, the apparatus is configured to determine number of folders at each folder location.

DETAILED DESCRIPTION OF THE OF THE INVENTION

Figure 1A:
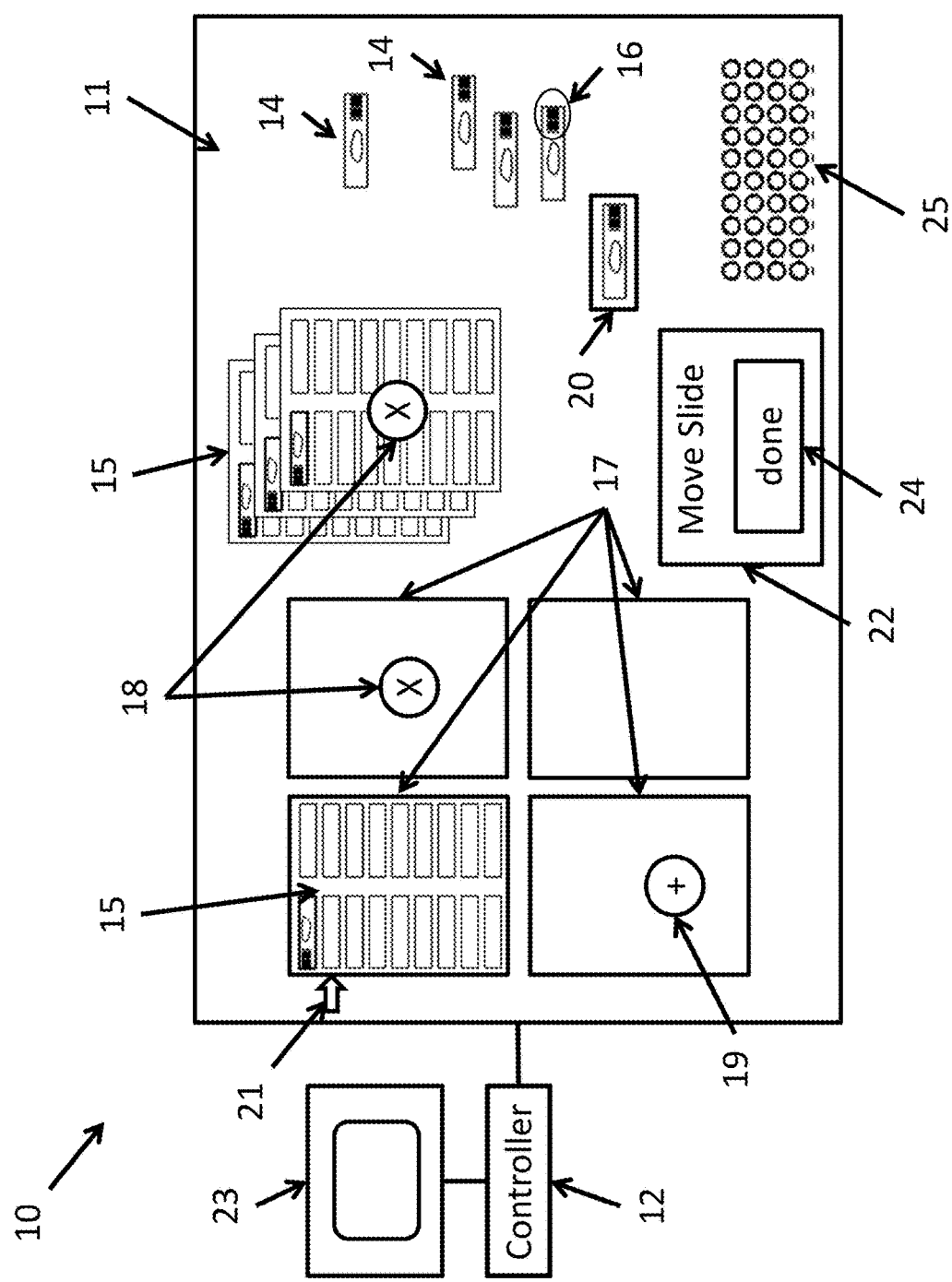
FIGS. 1A and 1B illustrate a slide sorting workbench according to one embodiment of the present invention.
Figure 1B:
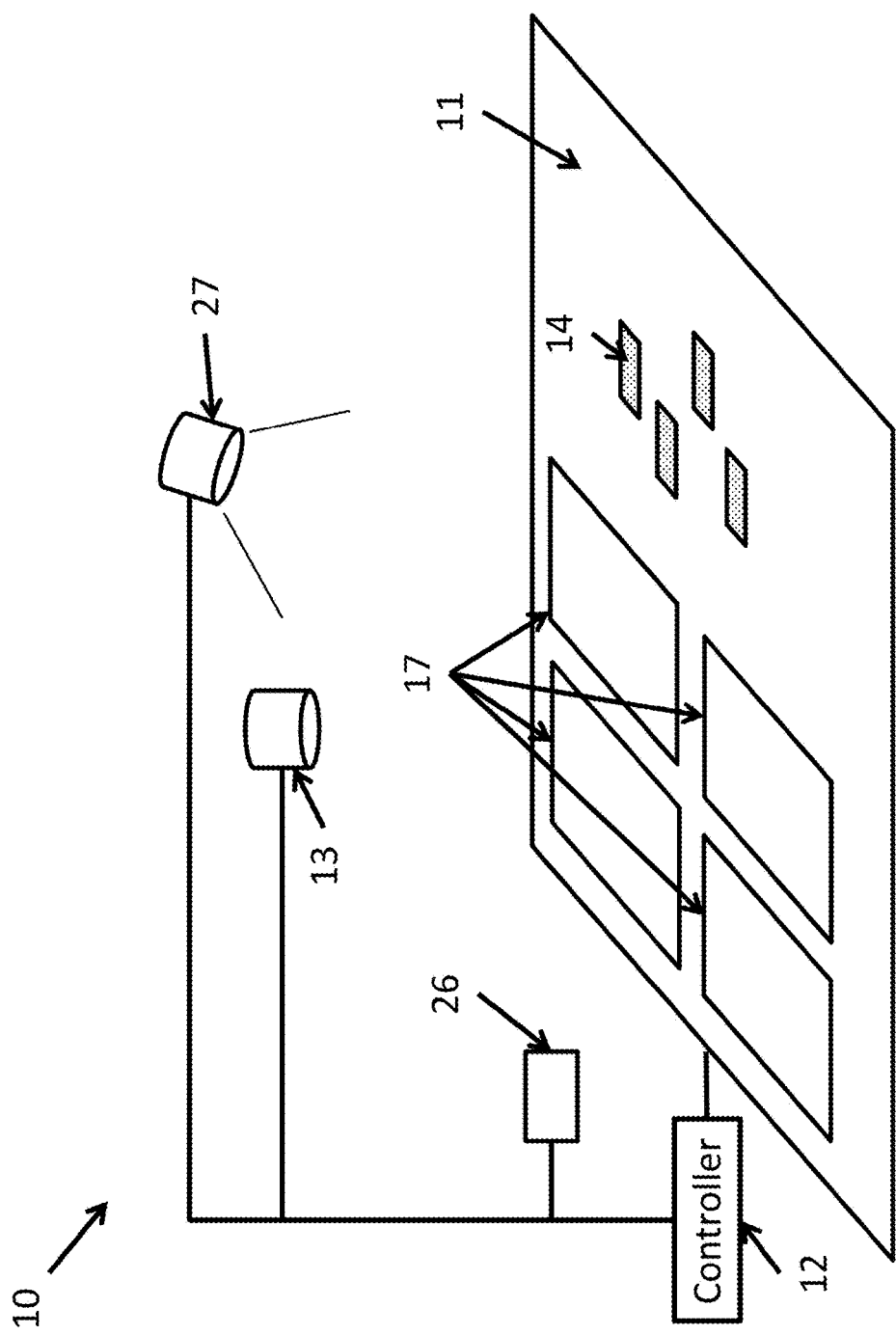

The manner in which the present invention provides its advantages can be more easily understood with reference to the problem of sorting microscope slide mounted samples in a pathology laboratory into multiple different folders. Referring now to FIGS. 1A and 1B, which illustrate a slide sorting workbench according to one embodiment of the present invention. FIG. 1A is a top view of the workbench, and FIG. 1B is a side view of the workbench. Workbench 10 includes a horizontal display surface 11 that is connected to a controller 12 that performs the image processing and display functions of the apparatus as described herein. The horizontal display surface can be any convenient size, in some embodiments ranging from about 2 meters wide by 1 meter in deep. Items placed on horizontal display surface 11 are viewed/imaged by a camera 13 that provides input to controller 12 which includes software that extracts relevant information from the images. Controller 12 controls the information displayed on horizontal display surface 11 and processes the information provided by camera 13. The slides to be sorted 14 and the folders 15 that are to receive the slides are placed on the display surface. The slides to be sorted can be placed randomly on the display surface, e.g., at a slide sorting location on the horizontal display surface 11 (general area with slides 14). The folders that are to receive the slides can be placed randomly on the display surface singly or in stacks, e.g., at a folder sorting location on the horizontal display surface 11 (general area with folders 15). In other embodiments, the folders 15 are kept off the display surface until the system requests that a new folder be placed on the horizontal display surface 11 at one of the multiple folder locations 17 during use (described in further detail below). Each slide to be sorted includes a controller readable label 16 that is viewable by camera 13 or a separate label reader 26. In some embodiments, each folder has a readable label (not shown) that is viewable by camera 13 or a separate label reader 26.

In certain embodiments, the apparatus includes multiple cameras that collectively capture images of the entire horizontal display surface. For example, the apparatus can include two cameras, each of which covers half of the display surface. The camera can have a pixel resolution of <400 microns/pixel, e.g., <250 microns/pixel, and have a frame per second rate (fps) of >10. The working distance of the camera can be between 0.7 meters and 1.2 meters. Examples of cameras include a Basler: (Mono) acA3800-14 um 10 megapixel camera (6.44×4.62 mm, 1.67 um pixel, Rolling shutter, 14 fps, USB3.0, 29×29×29 mm) and a camera with a Kowa: 5 mm, 10MP lens (Resolution: Center 200 lp/mm; Corner: 160 lp/mm; Distortion: −0.33% TV).

A user of the system picks a folder 15 and places it at one of the multiple folder locations 17. The folder and folder location to be moved can be indicated by a visual indicator 18 on the horizontal display surface 11 that is generated on the folder to be moved and/or the folder location at which the folder is to be placed (i.e., one of the folder locations 17). For example, if the folder to be picked up by a user is located on the display surface 11, either at one of the folder locations 17 or at the folder sorting location, a visual indicator is projected by the system onto the folder as well as on the folder location to which the folder is to be moved (the "X" symbol in FIG. 1A). In other embodiments, if the folder to be moved is not on the display surface, a visual indictor 19 can be projected to a folder location to which a new folder is to be placed (e.g., a "+" indicator projected at the folder location at which a new folder is to be placed). In alternative embodiments, the system will prompt a user to place a folder, either on or off the horizontal display surface, at any one of the folder locations. Visual indicators displayed from projector 13 (controlled by the controller) can provide additional instructions to a user in any convenient way. For example, the visual indicator can inform a user that a folder is complete, when and where to place a new folder, whether a slide is missing from the display surface or has been misplaced, etc. The controller can use visual indicators that are color coded, of different intensities or alternating (e.g., flashing), and/or include universal symbols such as arrows, plus signs, minus signs, etc., for its prompts in order to be language and culture independent. Texts or images (e.g., hand motions or facial representations) can also be displayed onto the slides and/or folders. It is noted that any convenient light source or combination of light sources can be employed as the projector, including but not limited to standard projectors (e.g., similar to what would be found in a conference room), a laser, LED, a light source and a steering mirror, or an array of light sources which illuminate the desired region on a slide and/or folder.

The apparatus will record which location was selected by the user to place the folder and proceed with the next moving step (either another folder moving step or a slide moving step, as described below). It is noted that while 4 different folder locations are shown in FIGS. 1A and 1B, the horizontal display surface can include any number of folder locations, including 2, 3, 4, 5, 6, 7, 8, 9, 10, 11, 12, 13, 14, 15, 16, 17, 18, 19, 20, or more different folder locations.

Once at least one folder 15 is placed at one or more of the folder locations 17, a user then picks up a slide from horizontal display surface 11 and places that slide in folder 15 at one of the multiple slide locations in folder 15 that is indicated by a visual indicator 21. The slide to be moved is also indicated by a visual indicator 20 on horizontal display surface 11 that is generated in the region of the slide that is to be moved. In the example shown in the figures, the region around the slide to be moved is illuminated (the box 20 represents an illuminated region over the slide inside). In this example, the slides that are not to be moved are not illuminated; however, in some embodiments, multiple slides can have visual indicators at a time that inform a user where they are to be moved. In some cases, the slides are to be moved in a particular order, whereas in other embodiments, the slides can be moved in any order decided by the user. It is noted that while marker 21 is shown as an arrow, other visual indicators can be used, e.g., a visual indicator that is the same as that used to identify the slide to be sorted to that slide location in the folder. For example, the visual indicator for the slide to be sorted and the slide location in the folder can be the same color or the same symbol, e.g., a number or "+" sign. In other embodiments, a moving visual indicator that travels between the slide and the location in the folder to place the slide is projected onto the horizontal display surface. Controller 12 continuously monitors the positions of the slides on horizontal display surface 11. When controller 12 detects that the indicated slide has been moved to the desired location in a folder 15 at one of the folder locations, the controller updates marker 21 to point to the next location in a folder that is to be filled and illuminates the corresponding next slide to be moved on horizontal display surface 11. The next location can be in the same folder or in a different folder at another folder location. In some embodiments, a folder moving step occurs prior to moving the next slide into a desired location in a folder. Folder moving processes, including the use of stacked folders, are described in further detail below.

The process is completed when all of the slides that are to be sorted have been sorted into the correct locations in their respective folders 15 or until the folders 15 are filled. If more slides remain to be sorted, the controller can instruct the user to place a new folder at an indicated folder location on horizontal display surface 11 (as described above) and the slide sorting process continues. In some embodiments, if one or more slides remain on the horizontal display surface that are not to be sorted into folders, the system can indicate an alternative action to the user (e.g., send a slide back to storage or place at a holding location on or off the horizontal display surface). Similarly, if one or more folders remain on the horizontal display surface that are not to be placed at the folder location and receive slides, the system can indicate an alternative action to the user (e.g., send a folder back to storage or place at a holding location on or off the horizontal display surface).

In one aspect of the invention, the controller verifies the placement of the slides in the folder to ensure that the slides are in their appropriate positions. If the controller detects that a slide is out of position or the wrong slide has been placed in the folder at the currently indicated position, the controller displays a warning message to the user. For example, if the slide is in the wrong position, the controller instructs the user to move the slide at the location marked by a first symbol to the location marked by a second symbol. If the wrong slide has been placed in the folder, the controller instructs the user to replace the slide at the indicated location with the slide that is currently illuminated on the display surface.

The communications between the user and the controller can utilize a free area 22 on horizontal display surface 11 or a separate graphical user interface (GUI) 23. In one aspect of the present invention, horizontal display surface 11 is a touch enabled display. In such embodiments, the user can then respond to commands from the controller by touching an area 24 associated with the command on horizontal display surface 11. In addition, an area 25 of horizontal display surface 11 can be used to simulate a keyboard in such touch enabled display when the user needs to type information into the controller.

Horizontal display surface 11 can be implemented using a conventional touch enabled computer monitor screen or a combination of a projector 27 and camera 13. The projector can generate a scan pattern on the surface of horizontal display surface 11 or display an image.

As indicated above, the apparatus supports folder detection and moving operations that include stacking folders on top of each other, e.g., for high slide volume applications. To enable folder stacking, e.g., at each of the multiple folder locations, the apparatus is configured to determine the folder stack height and convert the determined folder stack height into the number of folders in the stack. In these embodiments, a folder stack height algorithm can be input by a user, retrieved by the controller from memory (e.g., from a previous slide sorting run), or can be determined by the controller, e.g., by performing a calibration run. For example, a calibration run may be initiated in which a user is prompted to place a first folder at one or more (or all) folder locations to obtain a single folder height image and/or reading. The user is then prompted to place a second folder on top of the first folder at each location to obtain a two-folder stack height image and/or reading. This process can be repeated for any number of folder stack height readings (e.g., three, four, five, six, etc.) to obtain additional folder stack-height images and/or readings. This information can be used to generate an algorithm for assessing the number of folders in a stack at each folder location based on an image and/or reading taken of the top folder in the stack. Folder stack height can then be used as a parameter during a slide sorting run, e.g., to confirm that a user has placed a folder or multiple folders at the correct location(s).

Figure 2A:
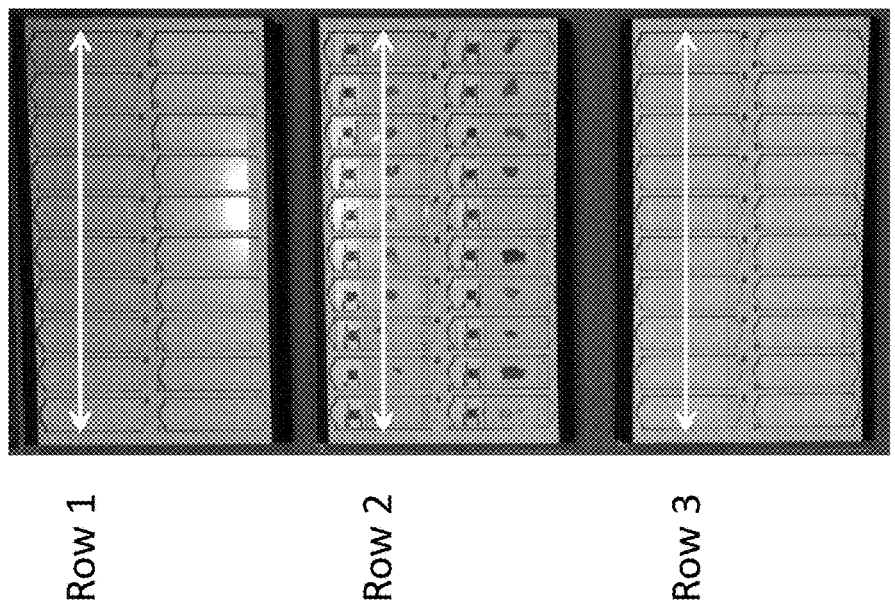
FIGS. 2A and 2B illustrate one example of a method for determining the number of folders in a stack of folders at a folder location.
Figure 2B:
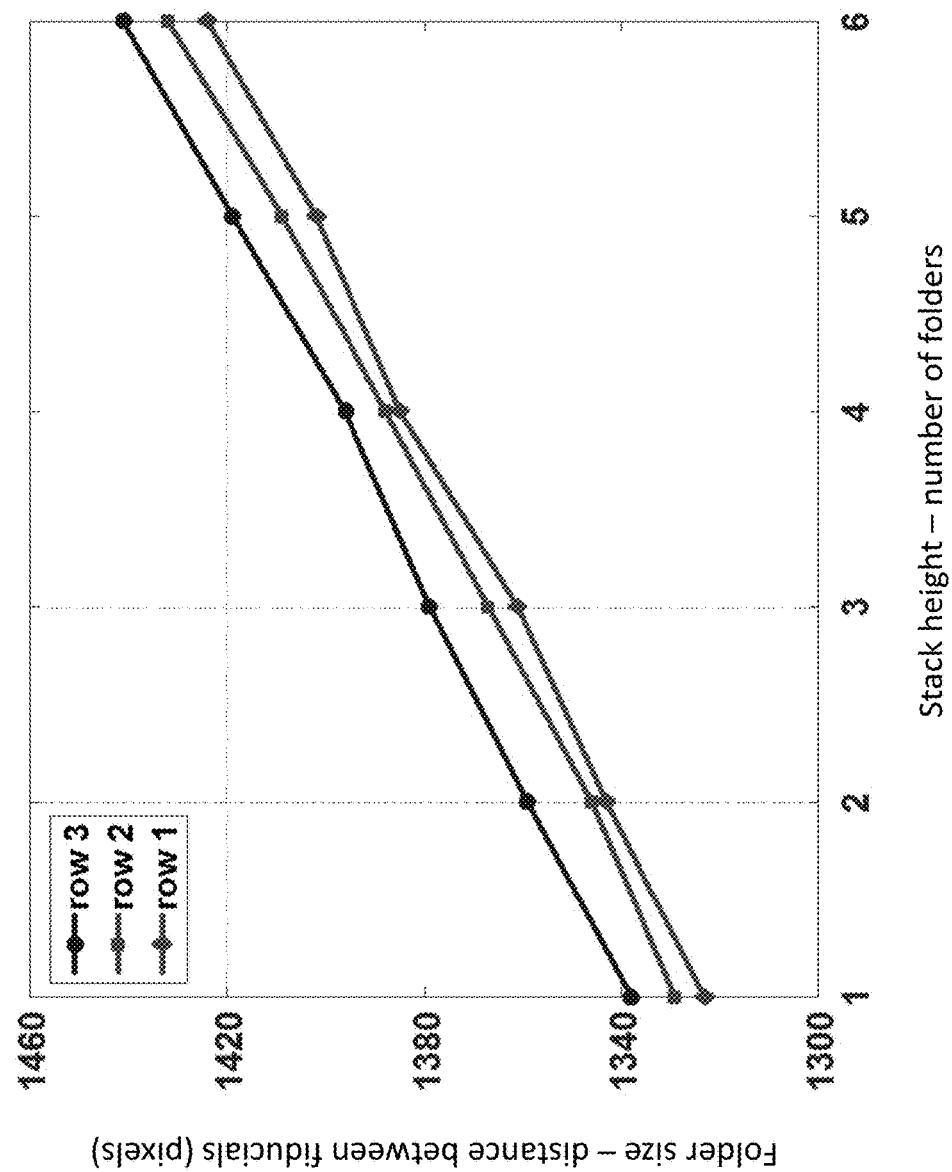

One example of how the apparatus can be calibrated to determine folder stack height is shown in FIGS. 2A and 2B. FIG. 2A shows three different folder locations of a horizontal display surface, each with a folder placed therein (designated row 1, row 2 and row 3). The apparatus captures an image of these three row locations using the camera 13 and determines a distance between the first and last slide location (or slot). The white arrows indicate the measured distances in rows 1 to 3. This distance (which can be determined in pixels from the collected image) is determined for stacks of 1, 2, 3, 4, 5, and 6 folders at each of the three folder locations and is plotted as shown in FIG. 2B. Thus, the apparatus can determine the number of folders in a stack at any folder location by measuring this distance of a folder placed at the location (in pixels) and comparing it to the plot in FIG. 2B. For example, if a folder in the folder location at row 1 has a measured distance of about 1340 pixels between the first and last slide location (or slot), there are 2 folders in the stack. A folder at the folder location at row 3 with a similar measured distance between the first and last slide location (i.e., 1340 pixels) has one folder at the location.

It is noted here that any convenient detection system and method for folder stack height determination can be used. Some of these are noted below.

Determining folder height:

1. Apparent size of the folder: As the folder stack gets taller, the top folder is closer to the camera and thus looks larger. The apparent size of the folder is measured by the apparatus and the folder stack height is calculated from a calibration file (similar to the example provided in FIGS. 2A and 2B and described above).

2. Shift of a projected fiducial: A spot projected at an angle onto a folder will shift location as a function of distance from the source. The top view camera can monitor this shift and calculate folder height from a calibration file.

3. Triangulation: Two or more spatially separated cameras looking at the same location can determine the height of the folder stack by triangulation.

4. Time of flight camera: A pulse of light is sent to the folders and its return time is measured by a sensor. Distance is calculated by using the speed of light.

5. Astigmatism: Light from an astigmatic source is focused at two different distances along perpendicular directions. This aberration can be used to measure distance by measuring the shape of a projected astigmatic spot as a function of distance. This shape can be tuned to give a larger effect over the distance of interest. The top view camera can monitor this shape change and calculated folder height from a calibration file.

6. Structured light projection: Patterns of light are sequentially projected onto the folders and the distortion of the patterns caused by the illuminated objects is used to compute the folder height.

7. Xbox Kinect sensor: A speckle pattern from an infrared laser illuminates the surface of a folder. Stereo cameras use the location of the known spot patterns to triangulate distance. This is an improved triangulation method which can handle parasitic cases that simple triangulation cannot.

8. Ultrasonic distance sensor: A sound pulse is reflected off the folders and the return time measured. Distance is calculated using the speed of sound.

9. Weight of the folder stacks: The weight of a folder stack is used to infer the number of folders. The number of slides in each folder (known from previous folder and slide manipulation steps) is used to subtract the weight of the slides from the measurement. In such embodiments, the folder locations include one or more scales in communication with the controller. Folder weight calibration files can be input by a user or determined in a calibration run.

10. Side view of the folder stack: A side view camera or an angled mirror in the top view camera field of view is used to visualize the side view of the folder stack to determine the number of folders. For example, the controller can determine the height of the stack in pixels from a side view image and calculate the number of folders at the location based on the determined height using a calibration file. As another example, the controller can use image recognition to detect the number of folder edges in the side view image of the stack, thereby determining the number of folders.

As noted above, the order in which slides appear in the folder can depend on the specific pathologist who is assigned to view the slides. The order in which the slides appear in the folder is determined by a listing in the controller. In one aspect of the invention, different orders are provided for different pathologists. Typically, a group of slides related to a given patient constitute a "case". When slides are being tracked by a laboratory information system (LIS), the slides will have patient and/or case identification. Cases are typically assigned to a given pathologist manually and entered into the LIS prior to the sorting procedure. The folders then can be tagged with a machine readable identification tag and tracked so that one or more cases can be pre-assigned to that folder. When the folder is placed on the work surface, it is immediately recognized by a tag or barcode on the folder and the appropriate slides illuminated for transfer. If a generic folder that is not pre-assigned is presented, the controller can assign the folder to a particular pathologist.

A user interface, e.g., small touch-screen, can allow the operator to handle miscellaneous tasks such as changing the sort method from patient-based folders to pathologist-based folders, handling errors such as a slide already being present in the prompted area, or other cases as needed. This system also enables recording performance metrics on individual operators, such as speed and quantity for performance grading.

The above-described embodiments depend on the ability of the controller to read the labels on each slide (represented by element 16 in FIG. 1A) using the camera or a separate label reader (described below). The labels can include a bar code or similar indicia that identifies each slide and is assigned by the individual who prepared the slide. The label can also include a limited amount of human readable textual information that provides information about the slide. However, in many situations, the amount of textual information that can be provided in a readable form on the label is much less than the amount of information that is available on the specimen included on the slide. The additional information is typically stored in a database that is indexed by a serial number on the slide label that is encoded in the barcode. In one aspect of the present invention, the controller accesses the database (e.g., on a remoter computer or database) and displays selected portions of the data next to the slide on horizontal display surface 11 or at a different user readable location, e.g., in free area 22 or on GUI 23. The information retrieved and (potentially) displayed can include information like a patient name, a number of slides in the patient's case, a patient status, a patient's physician, etc. This feature of the display surface is also useful when the pathologist is viewing the slides assuming that the pathologist has a similar display surface at his work station. In this case, the pathologist places the folder or the individual slides on the work surface and the controller displays the additional data. The apparatus then uses an algorithm to determine the folder into which to put the scanned slide as described in detail above. Factors that the controller may use to sort slides can include factors such as the number of pathologists who are to view the slide and their specialties, preferences on the number of patient slides to include in a single folder, the disposition of other slides in the patient case, tissue type, or tissue section number, among many others. No limitation in this regard is intended.

As indicated above, the controller can identify each of the slides to be sorted by utilizing a camera that views the items on horizontal display surface 11. However, other forms of identification reader could be utilized to detect and read the machine readable identification tags. For example, the labels could include an RFID tag that is powered by a light signal being received by the label. A light signal that illuminates a single slide can be provided by projector 13 shown in FIG. 1B. Upon being illuminated, the label derives sufficient power from the illumination signal to power a radio-frequency (RF) transmitter chip in the label which then transmits the serial number stored in the label to an RF receiver. The items on the surface of the display surface are then detected by scanning the surface with a light beam and detecting the RF transmissions associated with locations that are illuminated.

An RF receiver can also include an RF source such as an RF transmitter that activates the various RFID tags and reads the transmitted information. In such embodiments, the controller must determine the location of the RFID that is currently responding to the RF transmitter. In one aspect of the invention, the transmitter illuminates only one slide at a time. The transmitter can be a beam forming transmitter that scans the display surface. In another embodiment, the RF transmitter and receiver are connected to a mechanism that scans the display surface mechanically such that only one RFID tag is scanned at a time and the location of that RFID tag is determined by the position of the scanning mechanism.

In certain embodiments, the controller is configured to provide quality control information of one or more slides to the user. In certain of these embodiments, the controller can access slide-specific data in memory that includes quality control information, e.g., input by a user of the system or a pathologist who has previously handled the slide. This information can be associated with a barcode or RFID tag on the slide. A slide having a defect can be indicated to a user (flagged), e.g., by a visual indicator from the projector or on a display screen. When a slide is flagged as having a quality control defect, a user can verify the defect or deny the defect. If the defect is verified, the user can reject it and not sort it into a folder. A slide having a quality control defect can be discarded by a user and the system updated accordingly. If the defect is denied by a user, this information can be added to the slide-specific information by the controller and the slide can be placed in a folder where indicated (in other words, the user overrides the quality control flag). In some cases, the quality control data includes instructions from a previous user and/or a pathologist that states what to do with the slide if it is detected by the system, e.g., instructions for a user to discard the slide when next detected by the controller. Any type of quality control information can be stored by the system, including physical parameters (e.g., whether a slide is damaged), quality of the tissue section or tissue staining (e.g., whether the staining is consistent with other slides from the same tissue or has un-readable regions), whether the source of the tissue is accurate (e.g., the tissue section was mis-classified when originally made, e.g., wrong tissue or wrong patient from which it was derived), etc.

In the above-described examples, the folder and the slides can be placed at random locations on the display surface, and the controller uses the camera to identify the slides and their locations on the display surface. However, embodiments in which the folders or slides are placed at predetermined locations on the display surface can also be constructed, which simplifies the process of locating the slides and the labels. The predetermined locations can be specified by detents or guides on the horizontal display surface that confine the folders and/or slides to defined locations or by depressions in the horizontal display surface which provide a similar function. For the purposes of the present discussion the term "detent" will be used for any mechanism that confines a folder or slide to a specific orientation at a specific location on the display surface. In such an arrangement, the display surface can be simplified to a surface with indicator lights at each folder and/or slide location. The item to be moved can be indicated by lighting the indicator light adjacent to the location having the item. Similarly, the destination location can be indicated by the indicator light adjacent to the receiving slot in the folder. Placing the items in predetermined locations also simplifies the controller identification of the folders and/or slides, since the controller can narrow the areas in the field of view that need to be searched to the predetermined locations. In addition, the controller does not need to account for the possibility that the items are placed on the display surface with arbitrary rotations.

While the above-described embodiments are adapted for sorting slides into folders, the present invention can be utilized to facilitate any manual sorting task in which objects that can be identified by the controller are to be sorted to locations in a receiver. The controller only needs to be able to read an ID tag on each object and access a list that indicates where in the receiver the object is to be placed. Since the object is being moved manually, the problems associated with automating the pickup and movement of objects with different shapes or fragilities are avoided.

The controller in the above-described embodiments can be implemented in a general purpose data processing system or computer in which the display surface is one of the displays on the data processing system. Such embodiments are preferred, since the controller can take advantage of information stored on a network in which the controller participates. This allows the controller to access identification information corresponding to any particular identification number read from a folder or slide on the display surface. Embodiments in which the controller is implemented as a special purpose processor can also be constructed.

The cameras in the above-described embodiments are positioned over the work surface. However, embodiments in which the cameras are under a transparent work surface can also be constructed. In addition, embodiments in which cameras are provided on both sides of the work surface can be constructed. Similarly, the projectors can be positioned under a transparent work surface.

EXEMPLARY EMBODIMENTS

Non-limiting examples of embodiments of certain aspects of the subject disclosure are provided below.

1. Aspects of the present disclosure include an apparatus for facilitating manual sorting of slides, the apparatus comprising: a horizontal display surface; a camera; a light source; and a controller; wherein the horizontal display surface can be selectively illuminated by the light source and is adapted for receiving a plurality of slides and a plurality of folders into which the slides are to be sorted, wherein each of the plurality of slides comprises a machine readable identification tag; wherein the controller is configured to: (i) illuminate the horizontal display surface with the light source to indicate a folder location on the horizontal display surface to which each of the plurality of folders is to be moved; (ii) determine the number of folders stacked at the folder location; (ii) read the identification tag on each of the plurality of slides to retrieve identification information; and (iii) independently illuminate each of the slides on the display surface by the light source based on its identification information and indicate a slide location in one of the plurality of folders to which each illuminated slide is to be moved.

2. The apparatus of Embodiment 1, wherein the horizontal display surface comprises multiple folder locations, wherein the controller is configured to determine the number of folders in a stack of folders at each of the multiple folder locations.

3. The apparatus of any preceding Embodiment, wherein identification information is read from the horizontal display surface by the camera.

4. The apparatus of any preceding Embodiment, wherein the apparatus further comprises an identification reader, wherein the identification information is read by the identification reader.

5. The apparatus of any preceding Embodiment, wherein the controller is configured to illuminate the horizontal display surface to perform a folder stack calibration operation.

6. The apparatus of any preceding Embodiment, wherein the controller is configured to determine the number of folders stacked at the folder location by determining an apparent size of a dimension of the top folder at the folder location from an image collected from the camera and calculating the number of folders at the location based on the apparent size of the dimension using a calibration file.

7. The apparatus of any preceding Embodiment, wherein the controller is configured to determine the number of folders stacked at the folder location by determining a shape and/or a position of an icon projected onto the top folder at the folder location from the light source and calculating the number of folders at the location based on the shape and/or the position of the icon using a calibration file.

8. The apparatus of any preceding Embodiment, wherein the apparatus further comprises second camera spatially separated from the first camera, wherein the controller is configured to determine the number of folders stacked at the folder location by detecting the position of an icon projected onto the top folder at the folder location from the light source by the first camera and the second camera and calculating the number of folders at the location by triangulation.

9. The apparatus of Embodiment 8, wherein: the icon projected onto the top folder is a speckle pattern of infrared laser light, the first and second cameras are configured as stereo cameras, and the controller determines the number of folders at the folder location using calibration speckle patterns.

10. The apparatus of any preceding Embodiment, wherein the controller is configured to determine the number of folders stacked at the folder location by determining the height of the stack and calculating the number of folders at the location based on the determined height using a calibration file.

11. The apparatus of Embodiment 10, wherein the controller is configured to use the return time of a pulse of light or a sound pulse reflected from the top folder at the folder location to determine the height of the stack of folders.

12. The apparatus of Embodiment 10, wherein the controller is configured to use a side view image of the stack of folders to determine the height of the stack of folders.

13. The apparatus of any preceding Embodiment, wherein the folder location includes a scale in communication with the controller, wherein the controller is configured to determine the number of folders stacked at the folder location by determining the weight of the folders at the folder location and calculating the number of folders at the location based on the determined weight using a calibration file.

14. The apparatus of Embodiment 13, wherein the controller is configured to subtract the weight of the slides from the determined weight based on the number of slides known to be present in the folders at the folder location.

15. Aspects of the present disclosure include a method for sorting slides comprising: (i) obtaining a plurality of slides and a plurality of folders into which the plurality of slides are to be sorted, wherein each of the plurality of slides includes a machine readable identification tag; (ii) placing the plurality of slides on a horizontal display surface of an apparatus as set forth in any one of Embodiments 1 to 14; (iii) causing a data processing system to illuminate the horizontal display surface with the light source to indicate a folder location on the horizontal display surface to which a first of the plurality of folders is to be moved; (iv) determining that the first of the plurality of folders has been placed at the folder location; (v) reading the identification tag on a first of the plurality of slides to retrieve identification information; (vi) illuminating a first of the plurality of slides on the display surface by the light source based on its identification information and indicating a slide location in the first folder to which the first slide is to be moved; (vii) determining that the first of the plurality of slides has been placed at the indicated slide location in the first folder; and (viii) repeating steps (iii) to (vii) for a second folder and a second slide, wherein the determining step (ii) further comprises determining the number of folders stacked at the folder location.

16. The method of Embodiment 15, wherein steps (iii) to (viii) are repeated until each of the plurality of slides is moved to a location in one of the plurality of folders.

17. The method of any of Embodiments 15 to 16, wherein the horizontal display surface comprises multiple folder locations, and wherein the method further comprises determining the number of folders in a stack of folders at each of the multiple folder locations.

18. The method of any of Embodiments 15 to 17, wherein prior to step (ii), the method further comprises performing a folder stack calibration operation.

19. The method of any of Embodiments 15 to18, wherein determining the number of folders stacked at the folder location comprises: determining an apparent size of a dimension of the top folder at the folder location and calculating the number of folders at the location based on the apparent size of the dimension using a calibration file.

20. The method of any of Embodiments 15 to 19, wherein determining the number of folders stacked at the folder location comprises: determining a shape and/or a position of an icon projected onto the top folder at the folder location and calculating the number of folders at the location based on the shape and/or the position of the icon using a calibration file.

21. The method of any of Embodiments 15 to 20, wherein determining the number of folders stacked at the folder location comprises: detecting the folder stack at the folder location by a first camera and a second camera of the apparatus and calculating the number of folders at the location by triangulation.

22. The method of Embodiment 21, wherein the folder stack comprises an icon projected onto the folder stack, wherein the icon projected onto the top folder is a speckle pattern of infrared laser light, the first and second cameras are configured as stereo cameras, and the controller determines the number of folders at the folder location using calibration speckle patterns.

23. The method of any of Embodiments 15 to 22, wherein determining the number of folders stacked at the folder location comprises: determining the height of the stack and calculating the number of folders at the location based on the determined height using a calibration file.

24. The method of Embodiment 23, wherein determining the height of the stack comprises obtaining a return time of a pulse of light or a sound pulse reflected from the top folder at the folder location.

25. The method of any of Embodiments 15 to 24, wherein determining the number of folders stacked at the folder location comprises: obtaining a side view image of the stack of folders and: (i) determining the height of the stack in pixels from the image and calculating the number of folders at the location based on the determined height using a calibration file, or (ii) detecting the number of folder edges in the stack by image recognition.

26. The method of any of Embodiments 15 to 25, wherein determining the number of folders stacked at the folder location comprises: determining the weight of the folders at the folder location and calculating the number of folders at the location based on the determined weight using a calibration file.

27. The method of Embodiment 26, wherein the weight of the slides in the folders is subtracted from the determined weight, wherein the weight of the slides in the folders is based on the number of slides known to be present in the folders at the folder location.

The above-described Embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus for facilitating manual sorting of slides, the apparatus comprising:
a horizontal display surface;
a camera;
a light source; and
a controller;
wherein the horizontal display surface can be selectively illuminated by the light source and is adapted for receiving a plurality of slides and a plurality of folders into which the slides are to be sorted, wherein each of the plurality of slides comprises a machine readable identification tag;
wherein the controller is configured to:
(i) illuminate the horizontal display surface with the light source to indicate a folder location on the horizontal display surface to which each of the plurality of folders is to be moved;
(ii) determine the number of folders stacked at the folder location;
(ii) read the identification tag on each of the plurality of slides to retrieve identification information; and
(iii) independently illuminate each of the slides on the display surface by the light source based on its identification information and indicate a slide location in one of the plurality of folders to which each illuminated slide is to be moved.

2. The apparatus of claim 1, wherein the horizontal display surface comprises multiple folder locations, wherein the controller is configured to determine the number of folders in a stack of folders at each of the multiple folder locations.

3. The apparatus of claim 1, wherein identification information is read from the horizontal display surface by the camera.

4. The apparatus of claim 1, wherein the apparatus further comprises an identification reader, wherein the identification information is read by the identification reader.

5. The apparatus of claim 1, wherein the controller is configured to illuminate the horizontal display surface to perform a folder stack calibration operation.

6. The apparatus of claim 1, wherein the controller is configured to determine the number of folders stacked at the folder location by determining an apparent size of a dimension of the top folder at the folder location from an image collected from the camera and calculating the number of folders at the location based on the apparent size of the dimension using a calibration file.

7. The apparatus of claim 1, wherein the controller is configured to determine the number of folders stacked at the folder location by determining a shape and/or a position of an icon projected onto the top folder at the folder location from the light source and calculating the number of folders at the location based on the shape and/or the position of the icon using a calibration file.

8. The apparatus of claim 1, wherein the apparatus further comprises a second camera spatially separated from the first camera, wherein the controller is configured to determine the number of folders stacked at the folder location by detecting the position of an icon projected onto the top folder at the folder location from the light source by the first camera and the second camera and calculating the number of folders at the location by triangulation.

9. The apparatus of claim 8, wherein: the icon projected onto the top folder is a speckle pattern of infrared laser light, the first and second cameras are configured as stereo cameras, and the controller determines the number of folders at the folder location using calibration speckle patterns.

10. The apparatus of claim 1, wherein the controller is configured to determine the number of folders stacked at the folder location by determining the height of the stack and calculating the number of folders at the location based on the determined height using a calibration file.

11. The apparatus of claim 10, wherein the controller is configured to use the return time of a pulse of light or a sound pulse reflected from the top folder at the folder location to determine the height of the stack of folders.

12. The apparatus of claim 10, wherein the controller is configured to use a side view image of the stack of folders to determine the height of the stack of folders.

13. The apparatus of claim 1, wherein the folder location includes a scale in communication with the controller, wherein the controller is configured to determine the number of folders stacked at the folder location by determining the weight of the folders at the folder location and calculating the number of folders at the location based on the determined weight using a calibration file.

14. The apparatus of claim 13, wherein the controller is configured to subtract the weight of the slides from the determined weight based on the number of slides known to be present in the folders at the folder location.

15. A method for sorting slides comprising:
(i) obtaining a plurality of slides and a plurality of folders into which the plurality of slides are to be sorted, wherein each of the plurality of slides includes a machine readable identification tag;
(ii) placing the plurality of slides on a horizontal display surface of an apparatus as set forth in any one of claims 1 to 14;
(iii) causing a data processing system to illuminate the horizontal display surface with the light source to indicate a folder location on the horizontal display surface to which a first of the plurality of folders is to be moved;
(iv) determining that the first of the plurality of folders has been placed at the folder location;
(v) reading the identification tag on a first of the plurality of slides to retrieve identification information;
(vi) illuminating a first of the plurality of slides on the display surface by the light source based on its identification information and indicating a slide location in the first folder to which the first slide is to be moved;
(vii) determining that the first of the plurality of slides has been placed at the indicated slide location in the first folder; and
(viii) repeating steps (iii) to (vii) for a second folder and a second slide, wherein the determining step (ii) further comprises determining the number of folders stacked at the folder location.

16. The method of claim 15, wherein steps (iii) to (viii) are repeated until each of the plurality of slides is moved to a location in one of the plurality of folders.

17. The method of claim 15, wherein the horizontal display surface comprises multiple folder locations, and wherein the method further comprises determining the number of folders in a stack of folders at each of the multiple folder locations.

18. The method of claim 15, wherein prior to step (ii), the method further comprises performing a folder stack calibration operation.

19. The method of claim 15, wherein determining the number of folders stacked at the folder location comprises: determining an apparent size of a dimension of the top folder at the folder location and calculating the number of folders at the location based on the apparent size of the dimension using a calibration file.

20. The method of claim 15, wherein determining the number of folders stacked at the folder location comprises determining a shape and/or a position of an icon projected onto the top folder at the folder location and calculating the number of folders at the location based on the shape and/or the position of the icon using a calibration file.

* * * * *